United States Patent
Moriya et al.

(10) Patent No.: US 11,059,385 B2
(45) Date of Patent: Jul. 13, 2021

(54) ELECTRIC POWER SUPPLY CONTROL APPARATUS FOR VEHICLE AND ELECTRIC POWER SUPPLY CONTROL METHOD FOR VEHICLE

(71) Applicant: SUBARU CORPORATION, Tokyo (JP)

(72) Inventors: Fumiyuki Moriya, Tokyo (JP); Ken Watanabe, Tokyo (JP); Ryohei Hoshi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 144 days.

(21) Appl. No.: 16/557,661

(22) Filed: Aug. 30, 2019

(65) Prior Publication Data
US 2020/0106114 A1 Apr. 2, 2020

(30) Foreign Application Priority Data
Oct. 2, 2018 (JP) .............................. JP2018-187242

(51) Int. Cl.
| | |
|---|---|
| *B60L 58/10* | (2019.01) |
| *H01M 8/04007* | (2016.01) |
| *H01M 8/04828* | (2016.01) |
| *H01M 8/04537* | (2016.01) |
| *H01M 8/0432* | (2016.01) |
| *B60L 58/25* | (2019.01) |
| *B60L 3/00* | (2019.01) |
| *B60L 50/60* | (2019.01) |
| *B60L 50/50* | (2019.01) |

(52) U.S. Cl.
CPC ................ *B60L 58/10* (2019.02); *B60L 3/00* (2013.01); *B60L 3/0046* (2013.01); *B60L 50/50* (2019.02); *B60L 50/60* (2019.02); *B60L 58/25* (2019.02); *H01M 8/04037* (2013.01); *H01M 8/04358* (2013.01); *H01M 8/04626* (2013.01); *H01M 8/04947* (2013.01); *B60L 2240/34* (2013.01)

(58) Field of Classification Search
CPC ......... H01M 8/04037; H01M 8/04626; H01M 8/04947; B60L 3/00; B60L 3/0046; B60L 50/50; B60L 50/60; B60L 58/10; B60L 58/25; B60L 2240/34
USPC ............................................ 429/434
See application file for complete search history.

(56) References Cited

U.S. PATENT DOCUMENTS

| 2018/0111497 A1* | 4/2018 | Li ......................... B60L 58/15 |
| 2018/0201150 A1* | 7/2018 | Kubo .................... B60K 6/445 |

FOREIGN PATENT DOCUMENTS

JP          2012-044849 A        3/2012

* cited by examiner

*Primary Examiner* — James M Erwin
(74) *Attorney, Agent, or Firm* — McGinn IP Law Group, PLLC

(57) ABSTRACT

There is provide an electric power supply control apparatus for a vehicle comprising a battery, an electric motor, and a temperature controller, the electric power supply control apparatus sets one of upper limit values of driving electric power and temperature controlling electric power at a predetermined value that is equal to or smaller than a total electric power upper limit value without being limited by the other one of the driving electric power and the temperature controlling electric power, and sets the upper limit value of the other one of electric power in a way such that a sum of the upper limit value of the other one of electric power and the one of electric power is equal to or smaller than the total electric power upper limit value.

17 Claims, 4 Drawing Sheets

ELECTRIC POWER SUPPLY CONTROL APPARATUS FOR VEHICLE AND ELECTRIC POWER SUPPLY CONTROL METHOD FOR VEHICLE

CROSS-REFERENCE TO RELATED APPLICATION

The present application claims priority from Japanese Patent Application No. 2018-187242 filed on Oct. 2, 2018, the entire contents of which are hereby incorporated by reference.

BACKGROUND

The disclosure relates to an electric power supply control apparatus for a vehicle.

Conventionally, there has been known an electric power supply control apparatus for a vehicle including an electric motor capable of generating a driving force of the vehicle by being supplied with driving electric power from a battery and a temperature controller capable of controlling the temperature in a vehicle cabin by being supplied with temperature controlling electric power from the battery. For example, Japanese Unexamined Patent Application (JP-A) No. 2012-44849, a control apparatus of an electric vehicle controls electric power so that a sum of electric power for driving an electric motor and electric power that an in-cabin air conditioner can consume becomes equal to or smaller than a maximum permissible output of a battery pack. Then, the output of the electric motor is controlled so as to obtain a driving force requested by the driver during driving based on electric power for driving the electric motor.

In the control apparatus described in JP-A No. 2012-44849, as the maximum permissible output of the battery pack decreases, initially, electric power driving the electric motor is maintained at a level at which a substantially constant driving power is ensured, and electric power that the in-cabin air conditioner can consume is decreased from maximum electric power towards minimum ensured electric power for operation of the air conditioner, whereby the driving performance of the vehicle is prioritized. Next, when the electric power consumable by the in-cabin air conditioner reaches the minimum ensured electric power, the electric power for driving the electric motor is decreased while maintaining the electric power consumable by the in-cabin air conditioner at the minimum ensured electric power below the driving power ensuring electric power, whereby the operation of the in-cabin air conditioner is prioritized.

SUMMARY

An aspect of the disclosure provides an electric power supply control apparatus for a vehicle. The vehicle includes a battery, an electric motor configured to generate a driving force of the vehicle by receiving driving electric power from the battery, and a temperature controller configured to heat or cool at least one of a vehicle cabin and the battery by receiving temperature controlling electric power from the battery. The apparatus is configured to set one of an upper limit value of the driving electric power and an upper limit value of the temperature controlling electric power at a predetermined value that is equal to or smaller than a total electric power upper limit value without being limited by the other one of the driving electric power and the temperature controlling electric power. The total electric power upper limit value is an upper limit value of electric power within electric power that can be output by the battery and can be used by at least one of the electric motor and the temperature controller. The apparatus is configured to set the upper limit value of the other one of electric power in such a manner that a sum of the upper limit value of the other one of electric power and the one of electric power is equal to or smaller than the total electric power upper limit value.

An aspect of the disclosure provides an electric power supply control method for a vehicle. The vehicle includes a battery, an electric motor configured to generate a driving force of the vehicle by being supplied with driving electric power from the battery, and a temperature controller configured to heat or cool at least one of a vehicle cabin and the battery by being supplied with temperature controlling electric power from the battery. The method includes setting one of an upper limit value of the driving electric power and an upper limit value of the temperature controlling electric power at a predetermined value that is equal to or smaller than a total electric power upper limit value without being limited by the other one of the driving electric power and the temperature controlling electric power. The total electric power upper limit value is an upper limit value of electric power within electric power that can be output by the battery and can be used by at least one of the electric motor and the temperature controller. The method includes setting the upper limit value of the other one of electric power in such a manner that a sum of the upper limit value of the other one of electric power and the one of electric power is equal to or smaller than the total electric power upper limit value.

An aspect of the disclosure provides an electric power supply control apparatus for a vehicle. The vehicle includes a battery, an electric motor configured to generate a driving force of the vehicle by receiving driving electric power from the battery, and a temperature controller configured to heat or cool at least one of a vehicle cabin and the battery by receiving temperature controlling electric power from the battery. The apparatus includes circuitry. The circuitry is configured to set one of an upper limit value of the driving electric power and an upper limit value of the temperature controlling electric power at a predetermined value that is equal to or smaller than a total electric power upper limit value without being limited by the other one of the driving electric power and the temperature controlling electric power. The total electric power upper limit value is an upper limit value of electric power within electric power that can be output by the battery and can be used by at least one of the electric motor and the temperature controller. The circuitry is configured to set the upper limit value of the other one of electric power in such a manner that a sum of the upper limit value of the other one of electric power and the one of electric power is equal to or smaller than the total electric power upper limit value.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
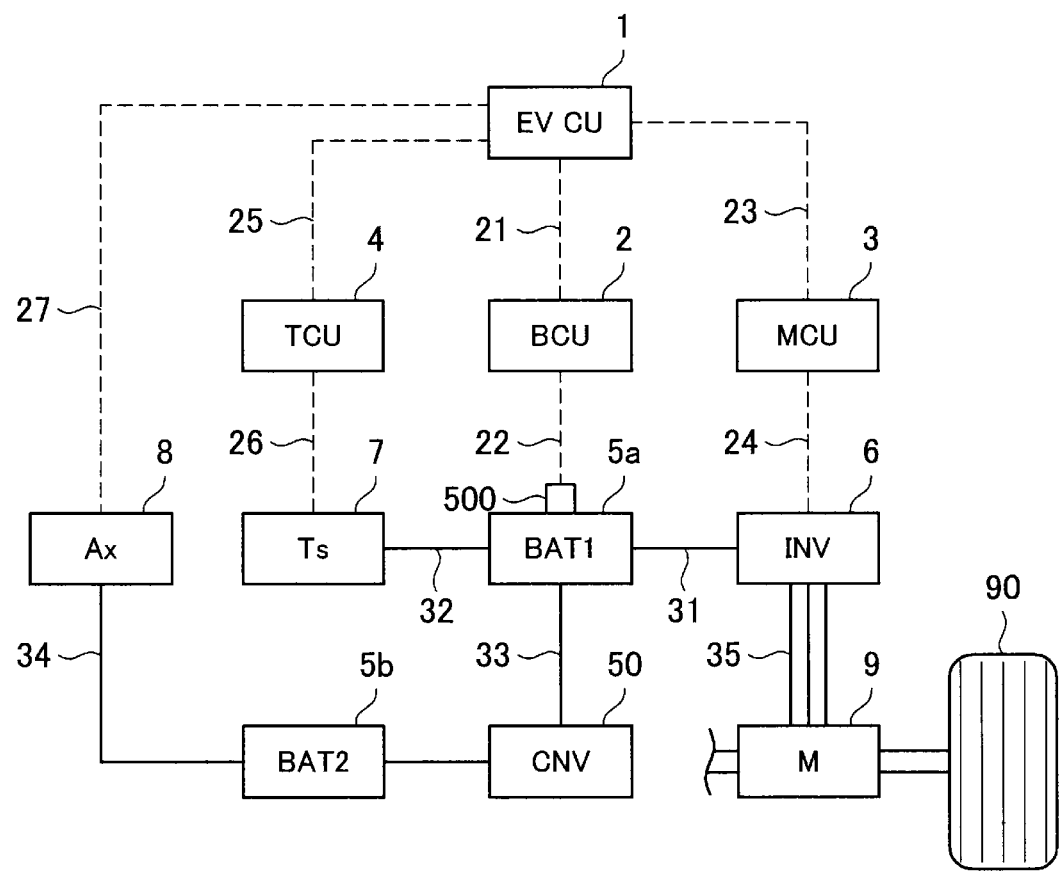
FIG. 1 is a schematic diagram illustrating a schematic configuration of a power supply system of an electric vehicle according to an embodiment of the disclosure.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

Hereinafter, a preferred embodiment of the disclosure will be described in detail by reference to accompanying drawings.

In this specification and the accompanying drawings, like reference signs will be given to constituent elements having substantially like functional configurations, and the repetition of like descriptions will be omitted here.

In the technique described in JP-A No. 2012-44849, in the electric power for driving the electric motor and the electric power consumable by the in-cabin air conditioner, a magnitude of the one electric power is limited in advance by an upper limit value of the other electric power. For example, the magnitude of the electric power for driving the electric motor is limited in advance to a value obtained by subtracting the "electric power consumable by the in-cabin air conditioner", which constitutes an upper value of the electric power that the in-cabin air conditioner can consume from the maximum permissible output of the battery pack. Therefore, the usable ranges of the electric powers cannot be expanded further, thereby making it difficult to make the motor performance or the driving performance of the vehicle by the electric motor using the driving electric power and the temperature controlling performance of the in-cabin air conditioner using the consumable electric power compatible at a high level.

The disclosure has been made in view of the problem described above, and it is desirable to provide a novel and improved electric power supply control apparatus for a vehicle that can expand a usable range of at least one of a driving electric power and a temperature controlling electric power.

Firstly, referring to FIG. 1, a schematic configuration of an electric power supply apparatus according an embodiment of the disclosure will be described. The electric power supply control apparatus is mounted on an electrically driven vehicle such as an electric vehicle. As illustrated in FIG. 1, the electrically driven vehicle, that is, an electric vehicle includes a high-voltage battery 5a, a low-voltage battery 5b, a motor 9, a temperature controller 7, and an auxiliary device 8.

The high-voltage battery 5a is a secondary battery and functions as a power source for the motor 9 and the temperature-controller 7. The high-voltage battery 5a is coupled to an inverter 6, the temperature-controller device 7, and a DC/DC converter 50 via power supply lines 31, 32, 33, respectively. An electric power of the high-voltage battery 5a is dropped down by the DC/DC converter 50 and is supplied to the low-voltage battery 5b. The high-voltage battery 5a may be a primary battery, a fuel cell, or the like.

The motor 9 is an electric motor and is, for example, a three-phase synchronous motor. The inverter 6 is coupled to the motor 9 via a power supply line 35. A wheel 90 is coupled to the motor 9 via a reduction gear, a drive shaft, and the like. The high-voltage battery 5a discharges to thereby supply driving electric power to the motor 9 via the inverters 6. During power driving, the motor 9 functions as a drive motor, which is supplied with driving electric power to generate power for driving the wheel 90, that is, a driving force for driving the vehicle. During regeneration, the motor 9 also functions as a generator, and may be driven by power transmitted from the wheel 90 as the vehicle speed decreases to thereby generate electric power. Electric power generated by the motor 9 is supplied to the high-voltage battery 5a via the inverters 6, whereby the high-voltage battery 5a can be charged.

The temperature controller 7 has a first device and a second device as part of a thermal system for performing heat management in the vehicle. The first device is an air conditioner for controlling the temperature of air inside in the vehicle cabin, and the first device can heat (heating) or cool (cooling) an interior of the vehicle cabin by being supplied with temperature cooling electric power from the high-voltage battery 5a. The first device is, for example, a heat pump fitted with an electric compressor configured to operate using the temperature controlling electric power and a heat exchanger. The first device may be an electric heater, such as a PTC heater, which operates using the temperature controlling electric power. The second device is a battery heater/cooler for controlling the temperature of the high-voltage battery 5a, and the second device can heat or cool the high-voltage battery 5a by being supplied with temperature controlling electric power from the high-voltage battery 5a. The second device is, for example, the heat pump common to the first device, and the second device may include a temperature controlling circuit through which a refrigerant of the air conditioner circulates. The second device may heat or cool the inverter 6.

The auxiliary device 8 includes electrical components and control units for indirectly assisting in driving the vehicle, and is coupled to the low-voltage battery 5b via a power supply line 34. The low-voltage battery 5b is a secondary battery having a voltage lower than that of the high-voltage battery 5a. The auxiliary device 8 operates by being supplied with auxiliary electric power from the low-voltage battery 5b. The electrical components include illuminating lamps, drive motors for such as wipers and power windows, defoggers or defrosters, and the like. A configuration may be adopted in which with the low-voltage battery 5b omitted, the electric power of the high-voltage battery 5a may be supplied directly to the auxiliary device 8 via the DC/DC converter 50.

As illustrated in FIG. 1, a control system of the electric vehicle includes a battery control unit 2, a motor control unit 3, a temperature control unit 4, and an EV control unit 1. Part or all of each of the control units 1 to 4 may be constituted by, for example, a microcomputer or a microprocessor unit. The microcomputer or the like may have a general configuration in which a central processing unit (CPU) configured to execute various arithmetic operations, a read-only memory (ROM) configured to store various control programs, a random access memory (RAM) used as a work area for data storage and program execution, and an input/output interface (I/O) are provided, and these constituent devices are coupled to each other by a bidirectional common bus. Part or all of these control units may be configured by updatable firmware, for example, or may be a program module executed by a command from CPU, for example.

These control units 1 to 4 are coupled to each other via signal lines 21, 23, and 25, which are communication lines such as a controller area network (CAN), and exchange control information or various pieces of information on a control target with each other.

The battery control unit 2 is coupled to the high-voltage battery 5a via the signaling line 22. The high-voltage battery 5a includes a battery sensor 500. The battery sensor 500 detects states of the high-voltage battery 5a, that is, a temperature, voltage, current, and the like of the high-voltage battery 5a, and outputs the detected states of the high-voltage battery 5a to the battery control unit 2. The battery control unit 2 calculates, for example, a state of charge (SOC), a functional state, a degree of deterioration of the high-voltage battery 5a based on the received information and outputs the calculated information to the EV control unit 1 and the like.

The motor control unit 3 is coupled to the inverter 6 via the signal line 24. Information on a current (driving electric power) at the motor 9 is inputted into the motor control unit 3 from the inverter 6, and a signal indicating a revolution speed of the motor 9 is inputted into the motor control unit 3 from the motor 9. The motor control unit 3 calculates a command signal based on the received information and outputs the command signal calculated to the inverter 6, whereby the motor control unit 3 controls the torque or revolution speed of the motor 9.

The temperature control unit 4 is coupled to the temperature controller 7 via a signal line 26. Information, for example, on a current (temperature controlling electric power) at the controller 7 is inputted into the temperature control unit 4. The temperature control unit 4 calculates a command signal based on the received information and outputs the command signal calculated to the temperature controller 7, whereby the temperature control unit 4 controls the temperature controller 7. As a result, the temperature control unit 4 functions as part of the thermal system by controlling the temperature in the interior of the vehicle cabin, the high-voltage battery 5a, and the like.

The EV control unit 1 is coupled to the auxiliary device 8 via a signal line 27. The EV control unit 1 calculates command signals based on the information received by way of the signal lines 21, 23, 25, 27, and the like, and outputs the command signals calculated to the auxiliary device 8, the motor control unit 3, and the temperature control unit 4. The EV-control unit 1 controls the electric power of the vehicle based on the state of the high-voltage battery 5a and the like in a unified fashion, and controls the operating states of the auxiliary device 8, the motor 9, and the temperature controller 7. As a result, the EV control unit 1 functions as an electric power supply control apparatus for the vehicle. Note that the signal lines 21 to 27 are simply signal transmission paths, and the signal lines may transmit signals not only in a wired fashion but also wirelessly.

Figure 2:
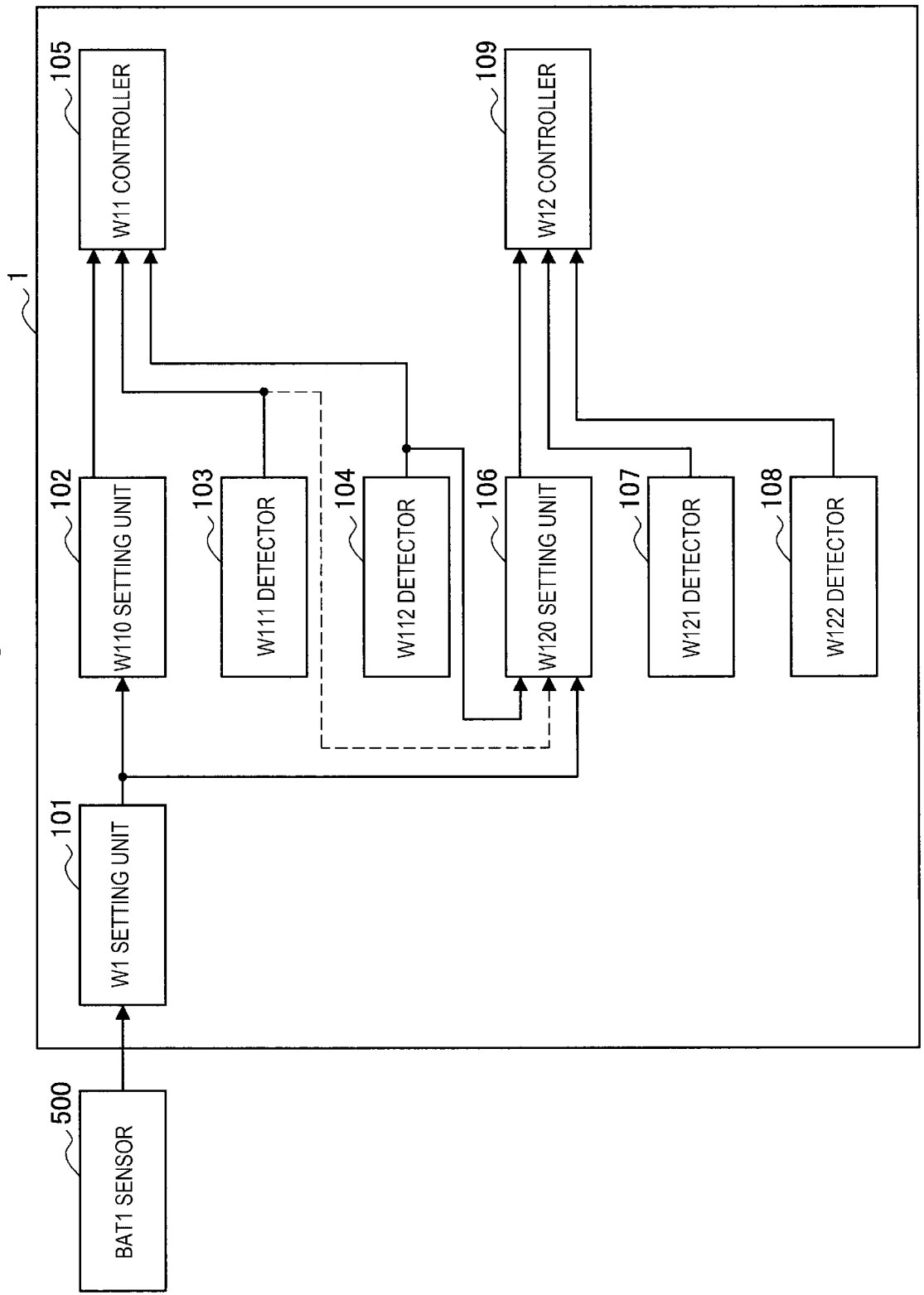
FIG. 2 is a functional block diagram of an EV control unit according to the embodiment.

As illustrated in FIG. 2, the EV control unit 1 includes, as individual functional units, a total electric power upper limit value setting unit 101, a first electric power upper limit value setting unit 102, a first electric power request value detector 103, a first electric power actual value detector 104, a first electric power controller 105, a second electric power upper limit value setting unit 106, a second electric power request value detector 107, a second electric power actual value detector 108, and a second electric power controller 109.

The total electric power upper limit value setting unit 101 sets a total electric power upper limit value W1. Specifically, the unit 101 calculates allowable output electric power W0, which is electric power that the high-voltage battery 5a can output, based on a signal from the battery sensor 500. The unit 101 sets a value obtained by subtracting auxiliary device operating electric power W2, which is electric power for use in operating the auxiliary device 8, from the allowable output electric power W0 as the total electric power upper limit value W1. The total electric power upper limit value W1 is an upper limit value of electric power usable for at least one of the motor 9 and the temperature controller 7, in the electric power W0 that the high-voltage battery 5a can output. The auxiliary device operating electric power W2 may be a predetermined value set in advance, or may be a value calculated based on a signal from the auxiliary device 8 or the low-voltage battery 5b.

The first electric power upper limit value setting unit 102 sets an upper limit value W110 of the first electric power W11. The first electric power W11 is one of the driving electric power and the temperature controlling electric power. Specifically, the first electric power upper limit value setting unit 102 sets the upper limit value W110 of the first electric power W11 to a predetermined value equal to or smaller than the total electric power upper limit value W1. More specifically, in the case where the first electric power W11 constitutes the driving electric power, that is, the driving prioritizing mode is selected, the first electric power upper limit value setting unit 102 sets the upper limit value W110 of the driving electric power W11 (a driving permissible electric power) to the total electric power upper limit value W1. In the case where a value of a rated output (a rated value) of the motor 9 is less than the total electric power upper limit value W1, the first electric power upper limit value setting unit 102 may set the upper limit value W110 of the driving electric power W11 to the rated value. In the case where the first electric power W11 constitutes the temperature controlling electric power, that is, the temperature control prioritizing mode is selected, the first electric power upper limit value setting unit 102 sets the upper limit value W110 of the temperature controlling electric power W11 (a temperature controlling permissible electric power) to a value of a rated output (a rated value) of temperature controller 7. This rated value is a predetermined value equal to or less than the total electric power upper limit value W1. When the value of the rated output of the temperature controller 7 is equal to or greater than the total electric power upper limit value W1, the first electric power upper limit value setting unit 102 may set the upper limit value W110 of the temperature controlling electric power W11 to the total electric power upper limit value W1.

The first electric power request value detector 103 detects a request value W111 for the first electric power W11. When the first electric power W11 is the driving electric power, the request value W111 is determined in accordance with, for example, the magnitude of a driving force that the driver requests the vehicle to output. The magnitude of the requested driving force can be detected based on, for example, an operation or depression amount of an accelerator pedal. When the first electric power W11 is the temperature controlling electric power, the request value W111 is determined in accordance with, for example, an operation amount of the first device (the air conditioner) of the temperature controller 7. This operation amount can be detected, for example, based on a set temperature for the interior of the vehicle cabin. The first electric power actual value detector 104 detects an actual value of the first electric power W11, that is, an actual value W112. The first electric power controller 105 executes a feedback control so that the actual value 112 of the first electric power W11 converses to the request value W111 within a range up to the upper limit value W110.

The second electric power upper limit value setting unit 106 sets an upper limit value W120 of the second electric power W12. The second electric power W12 is the other electric power of the driving electric power and the temperature controlling electric power. Specifically, the second electric power upper limit value setting unit 106 sets the upper limit value W120 of the second electric power W12 so that a sum (W120+W112) of the upper limit value W120 of the second electric power W12 and an actual value W112 of the first electric power W11 is equal to or smaller than the total electric power upper limit value W1. More specifically, the second electric power upper limit value setting unit 106 sets the upper limit value W120 of the second electric power W12 so that the sum (W120+W112) becomes smaller than the total electric power upper limit value W1. As a result, a margin W10 can be set, the margin "10 being a difference between the sum (W120+W112) and the total electric power upper limit value W1. The margin W10 is an allowance of the total electric power upper limit value W1 with respect to the sum (W120+W112) and is larger than zero. The margin W10 has a first margin W101 and a second margin W102.

For example, when the actual value W111 of the first electric power W11 is relatively small within a range where it remains smaller than the upper limit value W110, the second electric power upper limit value setting unit 106 sets the upper limit value W120 of the second electric power W12 to a predetermined maximum value. A value resulting from subtracting the maximum value and the actual value W112 of the first electric power W11 from the total electric power upper limit value W1 constitutes the first margin W101 (refer to FIG. 4). when the actual value W112 of the first electric power W11 is relatively great within the range where the actual value W112 remains smaller than the upper limit value W110, the second electric power upper limit value setting unit 106 sets the margin W10 to the second margin W102, which is smaller than the first margin W101 and sets a value resulting from subtracting the actual value W112 of the first electric power W11 and the second margin W102 from the total electric power upper limit value W1 to the upper limit value W120 of the second electric power W12. The upper limit value W120 is set to be smaller than the maximum value described above. When the actual value W112 of the first electric power W11 reaches the upper limit value W110, the second electric power upper limit value setting unit 106 sets the margin W10 to zero, and sets a value resulting from subtracting the upper limit value W110 of the first electric power W11 from the total electric power upper limit value W1 to the upper limit value W120 of the second electric power W12.

The second electric power upper limit value setting unit 106 sets the second margin W102 in accordance with a maximum permissible increasing rate of the first electric power W11 and a control response of the second electric power W12. Details will be described later.

As indicated by a broken lined arrow in FIG. 2, the second electric power upper limit value setting unit 106 may use the request value W111 of the first electric power W11 in place of the actual value W112 of the first electric power W11 or together with the actual value W112 in setting the upper limit value W120 of the second electric power W12 and the margin W10 as described above. The second power upper limit value setting unit 106 may use the command value of the first electric power W11 in place of the actual value W112 of the first electric power W11 or together with the actual value W112 in the setting described above. The electric power command value is, for example, a command value that the EV control unit outputs to the motor control unit 3 or the like.

The second electric power request value detector 107 detects a request value W121 of the second electric power W12 in the same way as the way in which the first electric power request value detector 103 does. The second electric power actual value detector 108 detects an actual value W122 of the second power W12. The second electric power controller 109 executes a feedback control so that the actual value W122 of the second electric power W12 converges to the request value W121 within a range up to the upper limit value W120 or smaller.

The EV control unit 1 can set the first electric power W11 as the driving electric power and set the second electric power W12 as the temperature controlling electric power to thereby execute a driving prioritizing mode in which using the driving electric power is prioritized. In addition, the EV control unit 1 can set the first electric power W11 as the temperature controlling electric power and set the second electric power W12 as the driving electric power to thereby execute a temperature control prioritizing mode in which using the temperature controlling electric power is prioritized.

In switching the priority modes, for example, when the SOC of the high-voltage battery 5a decreases to thereby decrease the total electric power upper limit value W1, causing the upper limit value W120 of the driving electric power W12 to lower below a predetermined minimum value during the temperature control prioritizing mode, the EV control unit 1 switches the temperature control prioritizing mode to the driving prioritizing mode. Alternatively, when the request value W121 of the driving electric power W12 exceeds the upper limit value W120 thereof to thereby cause a difference between the request value W121 and the upper limit value W120 to be equal to or greater than a predetermined value (for example, the margin W10), the EV control unit 1 switches the temperature control prioritizing mode to the driving prioritizing mode. This may occur when the driver depresses the accelerator pedal largely or quickly. In addition, a first mode prioritizing the driving performance of the vehicle and a second mode prioritizing the economy of the vehicle are provided as modes for controlling the driving force of the vehicle, and the driver switches the driving force control modes between these two modes.

In this case, when the driver switches the second mode to the first mode during the temperature control prioritizing mode, the EV control unit 1 may switch the temperature control prioritizing mode to the driving prioritizing mode.

On the other hand, when the request value W121 of the temperature controlling electric power W12 exceeds the upper limit value W120 thereof to thereby cause a difference between the request value W121 and the upper limit value W120 to be equal to or smaller than a predetermined value (for example, the margin W10) during the driving prioritizing mode, the EV control unit 1 switches the driving prioritizing mode to the temperature control prioritizing mode. This may occur when a difference between a set temperature in the first device (air conditioner) of the temperature controller 7 and the temperature in the interior of the vehicle cabin is a predetermined value or greater. Alternatively, when the driver switches the first mode to the second mode during the driving prioritizing mode, the EV control unit 1 may switch the driving prioritizing mode to the temperature control prioritizing mode.

Next, the working effect will be described. As described above, in each of the priority modes, the upper limit value W110 of the first electric power W11 is set at a predetermined value equal to or smaller than the total electric power upper limit value W1. This predetermined value is not limited by the second electric power W12. That is, the predetermined value is set independently of the upper limit value W120 of the second power W12. For example, when the first electric power W11 is the driving electric power, the predetermined value is the total electric power upper limit value W1, while when the first electric power W11 is the temperature controlling electric power, the predetermined value is the value of the rated output of the temperature controller 7. In other words, the magnitude of one electric power of the driving electric power and the temperature controlling electric power is not limited in advance by the upper limit value of the other electric power but is limited only by the upper limit value of the one electric power itself. Thus, since the usable ranges of both the electric powers can be expanded, the motor performance or the driving performance of the vehicle by the motor using the driving electric power and the temperature controlling performance by the temperature controller using the temperature controlling electric power can be made compatible with each other at a high level. The upper limit value W110 of the first electric power W11 may be set at the value equal to or smaller than the total electric power upper limit value W1 only in one of the driving prioritizing mode and the temperature control prioritizing mode. In this case, the usable range of the first electric power W11 can be expanded in the priority mode in which the upper value W110 of the first electric power W11 is so set.

When the upper limit value W110 of the first electric power W11 is set as described above, for example, a sum of the upper limit value W110 of the first electric power W11 and the upper limit value W120 of the second electric power W12 can be set at a great value exceeding the total electric power upper limit value W1. Regardless of the magnitude of an actual usage of the second electric power W12 relative to the total electric power upper limit value W1, the first electric power W11 can be used within the range of the upper limit W110. The upper limit value W110 is greater than what remains after the upper limit value W120 of the second electric power W12 is subtracted from the total electric power upper limit value W1. In this way, since the usable amount of the first electric power W11 is not limited in advance by the upper limit value W120 of the second electric power W12, the usable range of the first electric power W11 can be expanded.

In this embodiment, the upper limit value of the second electric power W12 is set so that the sum of the upper limit value W120 of the second electric power W12 and the actual value W112 of the first electric power W11 is equal to or smaller than the total electric power upper limit value W1. That is, in setting the upper limit value W110 of the first electric power W11 as described above, even when the actual value W112 of the first electric power W11 increases toward the upper limit value W110, the EV control unit 1 sets the upper limit value W120 of the second electric power W12 so that the sum of the actual value W112 of the first power W11 and the upper limit value W120 of the second electric power W12 becomes equal to or smaller than the total electric power upper limit value W1. As a result, the sum of the actual value W112 of the first electric power W11 and the actual value W122 of the second electric power W12 can be restrained from exceeding the total electric power upper limit value W1. Further, since the upper limit value W120 of the second electric power W12 is not set uniformly in advance, but is set finely in accordance with the actual value W112 of the first electric power W11, the usable range of the second electric power W12 can be expanded more effectively.

Specifically, the upper limit value W120 of the second electric power W12 is set so that the sum (W120+W112) of the upper limit value W120 of the second electric power W12 and the actual value W112 of the first electric power W11 is smaller than the total electric power upper limit value W1. Therefore, the margin W10 can be set. That is, in case the usable ranges of both the first and second electric powers W11, W12 are expanded as much as possible, in order to avoid a possibility of the sum of the actual values of both the first and second electric powers W11, W12 exceeding the total electric power upper limit value W1, it may be necessary to decrease the actual value of one electric power of both the first and second electric powers W11, W12 accordingly as the other electric power increases. In this case, due to a delay in controlling the one electric power, there may occurs a possibility of the sum of the actual values of both the first and second electric powers W11, W12 temporarily exceeding the total electric power upper limit value W1. To deal with this possibility, the EV-control unit 1 adds the margins W10 in setting the upper limit W120 of the second electric power W12. The margin W10 is the difference between the sum (W120+W112) and the total electric power upper limit value W1. By using the margin W10 as an allowance, the possibility described above can be reduced. That is, even when the first electric power W11 increases, the possibility of the sum of the actual value W112 of the first electric power W11 and the actual value W122 of the second electric power W12 temporarily exceeding the total electric power upper limit value W1 due to the delay in controlling the second electric power W12.

From the viewpoint described above, not only the actual value W112 but also the request value W111 of the first electric power W11 may be used in setting the upper limit value of the second electric power W12 or the margin W10.

More specifically, the second margin W102 is set in accordance with a maximum permissible increasing rate of the first electric power W11 (in other words, a maximum permissible value of an increasing rate) or in accordance with a control response (for example, a control delay time) of the second electric power W12. That is, there may be a possibility that a sum of both the first and second electric powers W11, W12 temporarily exceeds the total electric power upper limit value W1 due to a delay in controlling the second electric power W12, and this possibility tends occur more when the maximum permissible increasing rate of the first electric power W11 is great than when it is small. Additionally, the possibility described above tends to occur more when the control response of the second electric power W12 is low (for example, a time spent until the actual value W122 of the second electric power W12 decreases to the request value W121 thereof) than when it is high. Therefore, the possibility described above can be reduced by setting the second margin W102 greater when the maximum permissible increasing rate of the first electric power W11 is great than when it is small. The possibility described above can be reduced by setting the second margin W102 greater when the control response of the second electric power W12 is slow than when it is fast.

For example, the maximum permissible increasing rate of the first electric power W11, that is, the driving electric power during the driving prioritizing mode is set greater in the first mode in which the driving performance is prioritized than in the second mode in which the economy is prioritized. The maximum permissible increasing rate of the driving electric power has a function of improving the driving performance of the drive feel of the vehicle by suppressing a sudden change in driving electric power, that is, a sudden change in driving force, and from this viewpoint, a maximum permissible decreasing rate may be provided for the driving electric power. In addition, after the direction of the driving force is reversed from a negative direction to a positive direction as a result of the operation state of the motor 9 changing from regeneration to power driving, there may be a case where a control is performed to reduce the looseness of gears between the motor 9 and the wheel 90. In this case, the maximum permissible increasing rate of the first electric power W11, that is, driving electric power during the driving prioritizing mode can be set greater than when the motor 9 is in normal operation. In the case described above, the second margin W102 is advantageously set great in accordance with an increase in the maximum permissible increasing rate. Since the maximum permissible increasing rate of driving electric power can also vary depending on vehicle conditions such as vehicle speed and acceleration, the second margin W102 is advantageously set in accordance with a variation in the maximum permissible increasing rate.

The first electric power W11 may be driving electric power, and the second electric power W12 may be temperature controlling electric power. In this case, the upper limit value W110 of the driving electric power W11 can be set to the total electric power upper limit value W1. Therefore, since the usable range of the driving electric power can be expanded as much as possible, the driving performance of the vehicle by the driving electric power can be improved more effectively.

The first electric power W11 may be temperature controlling electric power, and the second electric power W12 may be driving electric power.

In this case, an upper limit value W11 of the temperature controlling power W11 can be set at the value of the rated output of the temperature controller. Therefore, since the usable range of the temperature controlling electric power can be expanded as much as possible, the temperature controlling performance of the vehicle by the temperature controlling electric power can be improved more effectively.

Figure 3:
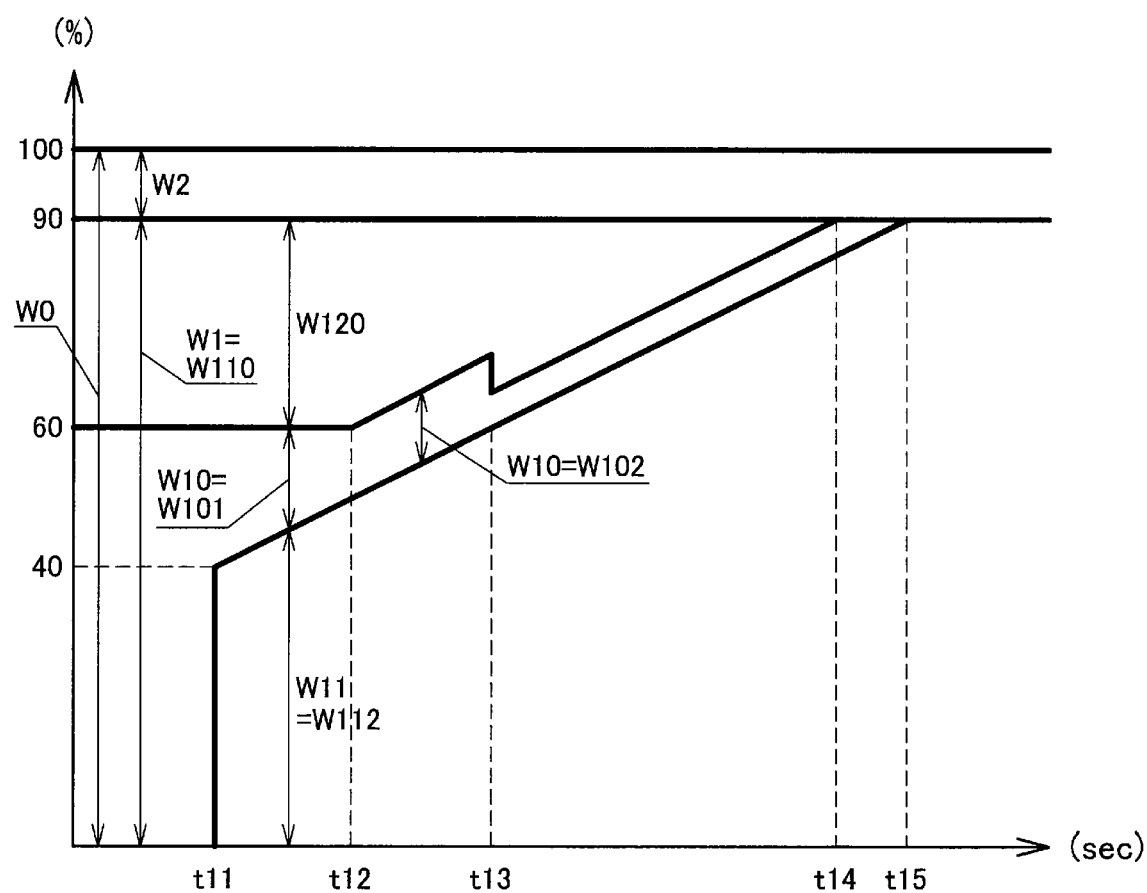
FIG. 3 is a time chart illustrating transitions of variables at the time of a driving prioritizing mode according to the embodiment.

Hereinafter, the operation will be described using a specific example. FIG. 3 illustrates an example of transitions of the first electric power, the upper limit value W120 of the second electric power W12, and the margin W10, with the first electric power W11 being driving electric power, and the second electric power W12 being temperature controlling electric power (with the driving prioritizing mode selected). An axis of ordinate denotes ratios of both the electric powers to an allowable output electric power W0 in percentage. An axis of abscissa denotes elapse of time. The auxiliary device operating electric power W2 is defined as 10%. A value (=90%) obtained by subtracting the auxiliary device operating electric power W2 (=10%) from the allowable output electric power W0 (=100%) constitutes the total electric power upper limit value W1.

Before time t11, the driving electric power W11 (the actual value W112. This will be true from here below) is zero. Therefore, the upper limit value W120 of the temperature-controlling electric power W12 is set at a predetermined maximum value. This maximum value is, for example, a value of the rated output of the temperature controller 7, and corresponds to a value representing 30% of the allowable output electric power W0. A value (=60%) obtained by subtracting a sum of the maximum value (=30%) and the driving electric power W11 (=0%) from the total electric power upper limit value W1 (=90%) constitutes the margin W10.

At time t11, the driving electric power W11 takes a value greater than zero, for example, 40%. From time t11 on, until the time t12 is reached, although the driving electric power W11 gradually increases but still remains relatively small. Therefore, the upper limit value W120 of the temperature-controlling electric power W12 is set at the maximum value (=30%). A value resulting from subtracting a sum of this maximum value (=30%) and the driving electric power W11 from the total electric power upper limit value W1 (=90%) constitutes the first margin W101. The first margin W101 decreases gradually as the driving electric power W11 increases.

At time t12, the driving electric power W11 becomes 50%, and the first margin W101 becomes 10%. From time t12 on, until time t15 is reached, the driving electric power W11 gradually increases. Since the driving electric power W11 becomes relatively great within a range less than the upper limit value W110, the margin W10 is set at the second margin W102 (=10%), and the upper limit value W120 of the temperature-controlling electric power W12 is set to be smaller than the maximum value. That is, a value resulting from subtracting a sum of the second margin W102 and the driving electric power W11 from the total electric power upper limit value W1 is set as the upper limit value W120 of the temperature controlling electric power W12. The upper limit value W120 gradually decreases as the driving electric power W11 increases.

The second margin W102 can be set at a value constituting a margin by which the sum (W12+W11) of the temperature controlling electric power W12 and the driving electric power W11 is prevented from exceeding the total electric power upper limit value W1 even temporarily by controlling the temperature controlling electric power W12 even when an actual increasing rate of the driving electric power W11 reaches a maximum permissible increasing rate and the temperature controlling electric power W12 reaches the upper limit value W120.

At time t13, the second margin W102 is set at a value (=5%) that is smaller than the value (=10%) before time t13. This is because, for example, the maximum permissible increasing rate of the driving electric power W11 becomes smaller than that before time t13. As the second margins W102 instantaneously decrease, the upper limit W120 of the temperature controlling electric power W12 instantaneously increases. At time t13, for example, in case the maximum permissible increasing rate of the driving electric power W11 becomes greater than that before time t13, the second margin W102 can be set at a value greater than the value (=10%) before time t13. In this case, the upper limit W120 of the temperature-controlling electric power W12 may decrease as the second margin W102 increases.

At time t14, the upper limit W120 of the temperature controlling electric power W12 becomes zero. At time t15, the driving electric power W11 reaches the total electric power upper limit value W1, that is, the upper limit value W110 of the driving electric power W11, and the margin W10 becomes zero.

Figure 4:
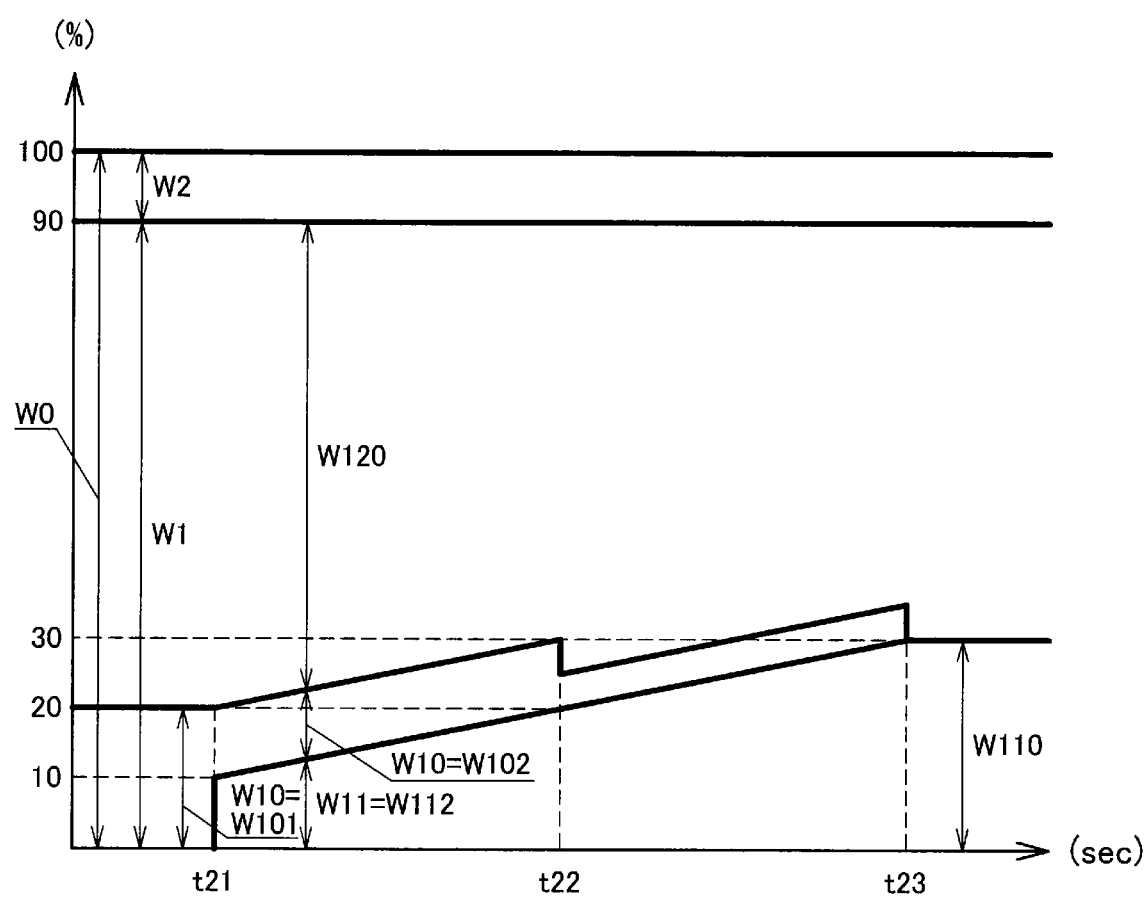
FIG. 4 is time chart illustrating transitions of variables at the time of a temperature control prioritizing mode according to the embodiment.

FIG. 4 illustrates an example of transitions of the first electric power W11, the upper limit value W120 of the second electric power W12, and the margin W10 with the first electric power W11 being temperature controlling electric power and the second electric power W12 being driving electric power (with the temperature control prioritizing mode selected). The auxiliary device operating electric power W2 (=10%) and the total electric power upper limit W1 (=90%) remain the same as in FIG. 3.

Before time t21, the temperature controlling electric power W11 (the actual value W112. This will be true from here below) is zero. Therefore, the upper limit value W120 of the driving power W12 is set at a predetermined maximum value. This maximum value is set at, for example, 70%. A value (=20%) resulting from subtracting a sum of the maximum value (=70%) and the temperature controlling electric power W11 (=0%) from the total electric power upper limit value W1 (=90%) constitutes the margin W10.

At time t21, the temperature controlling electric power W11 takes a value that is greater than zero, for example, 10%. From time t21 on, until time t23 is reached, the temperature controlling electric power W11 gradually increases. Since the temperature controlling electric power W11 is relatively great within a range less than the upper limit value W110, the margin W10 is set at the second margin W102, and the upper limit value W120 of the driving electric power W12 is set to be smaller than the maximum value (=70%). That is, a value resulting from by subtracting the second margin W102 and the temperature controlling electric power W11 from the total electric power upper limit value W1 is set as the upper limit value W120 of the driving electric power W12. The upper limit value W120 gradually decreases as the temperature controlling electric power W11 increases.

The second margin W102 can be set at a value constituting a margin by which the sum (W12+W11) of the driving electric power W12 and the temperature controlling electric power W11 is prevented from exceeding the total electric power upper limit value W1 even temporarily by controlling the driving electric power W12 even when an actual increasing rate of the temperature controlling electric power W11 reaches a maximum permissible value and the driving electric power W12 reaches the upper limit value W120.

At time t22, the second margin W102 is set at a value (=5%) smaller than the value (=10%) before time t22. This is because, for example, the permissible maximum value of the increase speed of the temperature controlling electric power W11 becomes smaller than that before the time t22. As the second margin W102 instantaneously decrease, the upper limit value W120 of the driving electric power W12 instantaneously increases. At the time t22, for example, in case the maximum permissible value of the increasing rate of the temperature controlling electric power W11 becomes greater than that before the time t22, the second margin W102 can be set at a value greater than the value (=10%) before the time t22. In this case, the upper limit value W120 of the driving power W12 may decrease as the second margins W102 increases.

At time t23, the temperature controlling electric power W11 becomes the value (=30%) of the rated output of the temperature controller 7, that is, the upper limit value W110 of the temperature controlling electric power W11. From time t23 on, the margin W10 is set at zero, and a value (=60%) resulting from subtracting the upper limit value W110 of the temperature controlling electric power W11 from the total electric power upper limit value W1 (=90%) is set as the upper limit value W120 of the driving electric power W12. By setting the margin W10 to zero in this manner, the upper limit value W120 of the driving electric power W12 can be increased. Since the temperature controlling electric power W11 reaches the upper limit value W110 and a further increase is restricted, there is little inconvenience of the margin W10 being zero.

In FIGS. 3, 4, the allowable output electric power W0, the auxiliary device operating electric power W2, and the total electric power upper limit value W1 are each depicted as being constant but may change. For example, the allowable output electric power W0 may decrease as the SOC of the high-voltage battery 5a decreases. The first electric power W11 may be the request value W112.

Thus, while the preferred embodiment of the disclosure has been described in detail by reference to the accompanying drawings, the disclosure is not limited to the embodiment. It is obvious that those having ordinary skill in the art to which the disclosure pertains can arrive at various alterations or modifications without departing from the scope of the technical idea described in claims, and it is understood that these alterations or modifications naturally fall within the technical scope of the disclosure.

For example, the vehicle to which the power supply control apparatus and the power supply control method of the disclosure are applied may be any vehicle capable of generating a driving force by an electric motor and hence is not limited to an electric vehicle but may be, for example, a hybrid vehicle that includes an internal combustion engine in addition to the electric motor as a source of driving force while being capable of running in an EV mode. The hybrid vehicle may be a plug-in hybrid vehicle that can be charged from an external power supply source.

As described heretofore, according to the disclosure, the usable range of at least one of the driving electric power and the temperature controlling electric power can be expanded.

The invention claimed is:
1. An electric power supply control apparatus for a vehicle,
   the vehicle comprising:
      a battery;
      an electric motor configured to generate a driving force of the vehicle by receiving driving electric power from the battery; and
      a temperature controller capable of heating or cooling at least one of a vehicle interior and the battery by receiving a supply of temperature regulating electric power from the battery,
   the electric power supply control apparatus for the vehicle being configured to:
      set one of an upper limit value of the driving electric power and an upper limit value of the temperature controlling electric power at a predetermined value that is equal to or smaller than a total electric power upper limit value without being limited by the other one of the driving electric power and the temperature controlling electric power, the total electric power upper limit value being an upper limit value of electric power within electric power that can be output by the battery and can be used by at least one of the electric motor and the temperature controller; and
      set the upper limit value of the other one of electric power in such a manner that a sum of the upper limit value of the other one of electric power and the one of electric power is equal to or smaller than the total electric power upper limit value.

2. The electric power supply control apparatus for the vehicle according to claim 1, wherein the electric power supply control apparatus is configured to set the upper limit value of the other one of electric power in such a manner that the sum of the upper limit value of the other one of electric power and the one of electric power is smaller than the total electric power upper limit value.

3. The electric power supply control apparatus for the vehicle according to claim 2, wherein the electric power supply control apparatus is configured to set a difference between the sum of the upper limit value of the other one of electric power and the one of electric power and the total electric power upper limit value in accordance with a maximum permissible increasing rate of the one of electric power.

4. The electric power supply control apparatus for the vehicle according to claim 2, wherein the electric power supply control apparatus is configured to set a difference between the sum of the upper limit value of the other one of electric power and the one of electric power and the total electric power upper limit value in accordance with a control response of the other one of electric power.

5. The electric power supply control apparatus for the vehicle according to claim 3, wherein the electric power supply control apparatus is configured to set the difference between the sum of the upper limit value of the other one of electric power and the one of electric power and the total electric power upper limit value in accordance with a control response of the other one of electric power.

6. The electric power supply control apparatus for the vehicle according to claim 1, wherein
the one of electric power is the driving electric power,
the other one of electric power is the temperature controlling electric power, and
the electric power supply control apparatus is further configured to set an upper limit value of the driving electric power to the total electric power upper limit value.

7. The electric power supply control apparatus for the vehicle according to claim 2, wherein
the one of electric power is the driving electric power,
the other one of electric power is the temperature controlling electric power, and
the electric power supply control apparatus is further configured to set an upper limit value of the driving electric power to the total electric power upper limit value.

8. The electric power supply control apparatus for the vehicle according to claim 3, wherein
the one of electric power is the driving electric power,
the other one of electric power is the temperature controlling electric power, and
the electric power supply control apparatus is further configured to set an upper limit value of the driving electric power to the total electric power upper limit value.

9. The electric power supply control apparatus for the vehicle according to claim 4, wherein
the one of electric power is the driving electric power,
the other one of electric power is the temperature controlling electric power, and
the electric power supply control apparatus is further configured to set an upper limit value of the driving electric power to the total electric power upper limit value.

10. The electric power supply control apparatus for the vehicle according to claim 5, wherein
the one of electric power is the driving electric power,
the other one of electric power is the temperature controlling electric power, and
the electric power supply control apparatus is further configured to set an upper limit value of the driving electric power to the total electric power upper limit value.

11. The electric power supply control apparatus for the vehicle according to claim 1, wherein
the one of electric power is the temperature controlling electric power,
the other one of electric power is the driving electric power, and
the electric power supply control apparatus is further configured to set an upper limit value of the temperature controlling electric power to a value of a rated output of the temperature controller.

12. The electric power supply control apparatus for the vehicle according to claim 2, wherein
the one of electric power is the temperature controlling electric power,
the other one of electric power is the driving electric power, and
the electric power supply control apparatus is further configured to set an upper limit value of the temperature controlling electric power to a value of a rated output of the temperature controller.

13. The electric power supply control apparatus for the vehicle according to claim 3, wherein
the one of electric power is the temperature controlling electric power,
the other one of electric power is the driving electric power, and
the electric power supply control apparatus is further configured to set an upper limit value of the temperature controlling electric power to a value of a rated output of the temperature controller.

14. The electric power supply control apparatus for the vehicle according to claim 4, wherein
the one of electric power is the temperature controlling electric power,
the other one of electric power is the driving electric power, and
the electric power supply control apparatus is further configured to set an upper limit value of the temperature controlling electric power to a value of a rated output of the temperature controller.

15. The electric power supply control apparatus for the vehicle according to claim 5, wherein
the one of electric power is the temperature controlling electric power,
the other one of electric power is the driving electric power, and
the electric power supply control apparatus is further configured to set an upper limit value of the temperature controlling electric power to a value of a rated output of the temperature controller.

16. An electric power supply control apparatus for a vehicle,
the vehicle comprising:
a battery;

an electric motor configured to generate a driving force of the vehicle by receiving driving electric power from the battery; and a temperature controller capable of heating or cooling at least one of a vehicle interior and the battery by receiving a supply of temperature regulating electric power from the battery, the method comprising:

executing setting one of an upper limit value of the driving electric power and an upper limit value of the temperature controlling electric power at a predetermined value that is equal to or smaller than a total electric power upper limit value without being limited by the other one of the driving electric power and the temperature controlling electric power, the total electric power upper limit value being an upper limit value of electric power within electric power that can be output by the battery and can be used by at least one of the electric motor and the temperature controller; and setting an upper limit value of the other one of electric power in such a manner that the sum of the upper limit value of the other one of electric power and the one of electric power is equal to or smaller than the total electric power upper limit value.

17. An electric power supply control apparatus for a vehicle, the vehicle comprising:

a battery;

an electric motor configured to generate a driving force of the vehicle by receiving driving electric power from the battery; and a temperature controller capable of heating or cooling at least one of a vehicle interior and the battery by receiving a supply of temperature regulating electric power from the battery, the electric power supply control apparatus for the vehicle comprising circuitry configured to:

set one of an upper limit value of the driving electric power and an upper limit value of the temperature controlling electric power at a predetermined value that is equal to or smaller than a total electric power upper limit value without being limited by the other one of the driving electric power and the temperature controlling electric power, the total electric power upper limit value being an upper limit value of electric power within electric power that can be output by the battery and can be used by at least one of the electric motor and the temperature controller; and set the upper limit value of the other one of electric power in such a manner that a sum of the upper limit value of the other one of electric power and the one of electric power is equal to or smaller than the total electric power upper limit value.

* * * * *